United States Patent [19]

Chan et al.

[11] 4,136,399

[45] Jan. 23, 1979

[54] DYNAMIC CHANNEL ALLOCATION BUFFER MATRIX

[75] Inventors: Robert H. G. Chan, Mt. Laurel, N.J.; Martin R. Mann, Philadelphia, Pa.; Francis M. McDonnell, Cherry Hill, N.J.

[73] Assignee: RCA Corporation, New York, N.Y.

[21] Appl. No.: 799,077

[22] Filed: May 20, 1977

[51] Int. Cl.² .............................................. G06F 1/00
[52] U.S. Cl. .................................................... 364/900
[58] Field of Search ... 364/200 MS File, 900 MS File; 179/18 ES, 15 BA

[56] References Cited

U.S. PATENT DOCUMENTS

| 3,632,882 | 1/1972 | Ciecierski et al. | 179/15 BA |
| 3,732,548 | 5/1973 | Howells et al. | 364/900 |

Primary Examiner—Raulfe B. Zache
Attorney, Agent, or Firm—H. Christoffersen; Samuel Cohen; Carl V. Olson

[57] ABSTRACT

Buffer division matrix for multiplexing and demultiplexing information signals in a communication system. A controller network controls information flow through a memory shared with a processor. The shared memory and the controller network comprise the buffer matrix, operating as a buffer division circuit switch and as a dynamic multiplexer/demultiplexer for high speed trunks. The buffer matrix is coupled to the processor as if the matrix were a memory. A control memory contains information about each subscriber and trunk to be serviced by the buffer matrix, information to control channel scan, and the characteristics of each channel. The control memory is initialized by the processor. Subscanning is implemented to increase the efficiency of the system.

5 Claims, 18 Drawing Figures

DYNAMIC CHANNEL ALLOCATION BUFFER MATRIX

The invention herein described was made in the course of or under a contract or subcontract thereunder, with the Department of the Air Force. The U.S. Government has rights in this invention pursuant to Contract No. F30602-75-C-0109 awarded by the Department of the Air Force.

This invention relates to communications control including switching, buffering and dynamic channel allocation.

Communications controllers are designed to control many input and output functions in data processing systems. One function is message switching wherein messages received from remote terminals are analyzed to determine their proper destination, converted to different codes if necessary, and transmitted to other remote terminals or switching systems.

Another function is "front-end" processing in which the controller not only passes data through its network, but performs some minor processing such as formatting and error control. This increases the system efficiency by relieving an associated data processor from performing these tasks.

Line concentration is another function of a communication controller. An example of this function is the termination of several low-speed lines which are interfaced to a fewer number of high-speed lines so that the data transmission becomes more economical and efficient. In the case of a controller coupled to an associated processor, the communications controller terminates all the lines coming into the system, making it necessary for the processor to handle only a single line.

In performing these functions, the communications controller must detect that a line is ready to receive or to transmit, to answer calls and to acknowledge them, and to originate calls to other terminals. Controllers must also provide for assembling characters if the bits comprising the characters are serially transmitted so that the received words of complete messages can be transferred to the associated processor in parallel. This includes recognizing the beginning of messages, locking on synchronization patterns, and recognizing the end of messages. If the messages are transmitted in a code different from that used by the associated processor, the data must be converted from the message code into the processor code. Some editing is often required such as removing inserted spaces and zeroes and restructuring a message sent in a non-linear fashion, e.g., using certain data compression methods. This might include error checking and control if the messages were sent or received with error checks or error correcting capabilities. The controller should be able to store several messages so that the number of interruptions of the main processor is minimized.

Communications controllers are necessarily very complex and are sometimes replaced by programmable computers, some of which are specifically designed for efficient communications processing. When both digital and analog information must be handled and routed, the situation can become even more complicated. Dynamic channel allocations further complicate the implementation of the network and the ability of the channel controller to handle data on a real time basis. Dynamic channel allocation permits combining digitized voice and data on a single wideband communications channel dynamically by a controller. The proportion of total bandwidth of the channel allocated to a given class of traffic is dynamically altered according to the traffic load imposed and the priority scheme. In dyanmic channel allocation, the channel bandwidth is divided into frames of fixed length which are short compared to the duration of a voice conversation, but long compared to a block of digital data. The slots within this frame are completely flexible in both length and assignment. Slot assignments, priorities, and length vary according to the type and quantity of traffic imposed. The classes of traffic which a dynamically allocated channel must handle are: packet data, record data (such as Autodin), bulk data (computer-to-computer transfer), digitized voice (secure and non-secure) and image data.

In the classical method of combining digitized voice and data on the same transmission path, the transmission channel bandwidth is divided into slots of fixed size. Certain of these slots are preassigned on a fixed basis to data, the remainder being assigned to voice. Therefore, each bandwidth segment is treated as a separate entity with an upper boundary which has to be designed to meet the blocking probabilities and allowable delays of each system (voice or data). Although the voice and data arrival rates vary, when either one exceeds the assigned capacity, the utilization of possible vacant capacity in the other segment is not possible due to the fixed assignments.

Another method of combining digitized voice and data in packet networks is to packetize the voice and transmit it as data through the network. A disadvantage is that with routing algorithms generally applicable to packet networks, packets do not always arrive in the same order at the receiving node as the order in which they were transmitted. Therefore, reordering must be performed prior to transmitting the message to the receiving subscriber. Also, the protocol disciplines for retransmission of packets with errors are not necessary for successful transmission of digitized voice. Another disadvantage is that in high or peak load situations, the probability of packets arriving out of sequence increases significantly, producing a situation which cannot be resolved at a receiving node. Also, in transmitting secure voice, it is absolutely necessary that a steady bit stream be provided to the receiving terminal to keep the security equipment in synchronization.

The existing communications controllers are a result of compromising some of the above-described functions so that those considered most important are handled in an efficient manner. The invention disclosed and described herein, however, can perform all of the functins on-line in real time.

A system embodying the invention includes a plurality of buffers for receiving and transmitting data and a data memory having addressing means and data port means. There are buffer selector means for coupling a selected buffer to the data port means of the data memory. A control memory supplies addressed control words to a control word register having at least one section. Means responsive to a section of the control word register couple an address in the control word to the data memory addressing means. There are also provided means for coupling a section of the control word register to the control memory addressing means and for coupling a section of a control word to the buffer selector means.

Figure 1:
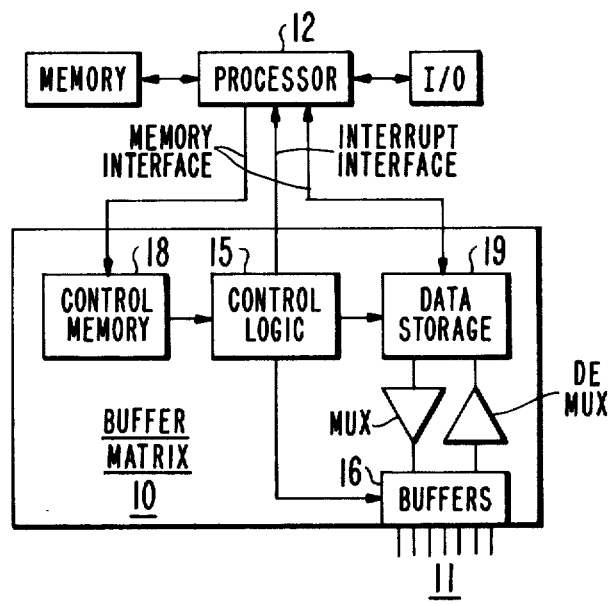
FIG. 1 is a block diagram of a buffer matrix according to the invention showing its relation to an associated processor system.

The buffer matrix provides full-duplex service for data and digitized voice communication among a number of subscribers and an inter-nodal trunk. Subscriber-to-subscriber traffic is not the primary function of the buffer matrix; trunk-to-trunk traffic as required by a tandem switch and a subscriber-to-trunk traffic as required of an access switch are provided by the buffer matrix. The total data rate capacity of the buffer matrix (BMX) is a constant, fixed by the processing speed of the memory and controlling processor. A wide range of subscribers and data rates is possible, provided that the sum of their individual data rates is not greater than the buffer matrix data rate capacity. Trunk processing requires more time than subscriber processing so actual data rates depend on the combination of trunks and subscribers, but can range typically between 4.06 megabits per second and 5.92 megabits per second.

The buffer matrix performs programmed scans, each of which can be divided into subscans. The organization of the scan table depends on the speed and number of subscribers and trunks in a given application. The length of a subscan is based on the number of subscribers or trunks which can be serviced within one character interval of the highest speed subscriber or trunk. Trunk service usually requires less than 4 microseconds, and subscriber service usually requires less than 3 microseconds. (Service involves handling one transmit character and one receive character.) More specifically, $$NT + MS \leq I$$

where
N = number of trunks in a subscan,
T = trunk service period,
M = number of subscribers in a subscan,
S = subscriber service period, and
I = character interval for highest speed subscriber/trunk.

Subscriber lines and trunks to the BMX are multiplexed over two data buses, i.e., a transmit data bus and a receive data bus, each having, for example, eight bit lines in parallel. The multiplexing process is controlled by the BMX using character buffer subsets (CBSS) via address lines. When the BMX addresses a subscriber, it first services the transmit link, then the receive link. The full-duplex service interval is typically 2.7 microseconds, but may extend up to 3.4 microseconds in special circumstances. For trunks, the full-duplex service intervals are typically 3.88 to 5.8 microseconds.

The BMX depends on a controlling processor for traffic routing, trunk format, protocol, hardware alarms, and accuracy control. The BMX also depends upon the controlling processor for initialization and system definition, viz, the number and data rates of subscribers, scan table and synchronization of inter-nodal trunks. Typical protocols are ADCCP (Advanced Data Communication Control Procedure) and SDLC (Synchronous Data-Link Control).

Processor control is conducted through the processor's memory interface, i.e., the control and data storage of the BMX are addressable by the controlling processor. The functioning of the BMX depends on the information resident in this storage. This type of interface provides the processor with complete control and direction without requiring character by character participation in the traffic flow. The BMX functions and operations requiring immediate attention by the controlling processor use the processor's interrupt interface, providing appropriate signals to the processor when specified boundaries are reached in the traffic flow or when alarms occur which might affect traffic flow, e.g., errors in data or format. The processor responds via the memory interface.

This is shown in FIG. 1 in block diagram. The BMX 10 receives subscriber lines and trunk lines 11 via external character buffers 16. The controlling processor 12 has access to an internal control memory 18 and a data memory 19 via the memory interface. The control logic 15 communicates with processor 12 via the interrupt interface.

Subscriber data is accepted from and delivered to the subscriber interface (CBSS) by the BMX, typically in eight-bit parallel characters. The CBSS assemble the characters if received from the subscriber as a serial bit stream. No parity, symbol, identity, protocol, format, or in-band control is assumed or imposed by the BMX. The data rate is determined externally and must be accommodated by the BMX to insure against underflow or overflow. Each subscriber is, therefore, assigned an input and an output data buffer of appropriate size in the BMX. These buffers are located at specified locations in the data memory 19 of the BMX 10.

The trunk format is specified in the BMX. The basic repetitive element in the trunk format is the "frame" which comprises a fixed number of characters, assumed to be 1440 for illustrative purposes, but is completely variable. The first twelve bytes (eight-bit characters) of each frame are reserved for control and the rest of the frame is data. Data is read from a number of buffers in the buffer sequence and number of characters controlled by a trunk list. A trunk list must assign sufficient data to fill up a frame.

Figure 2:
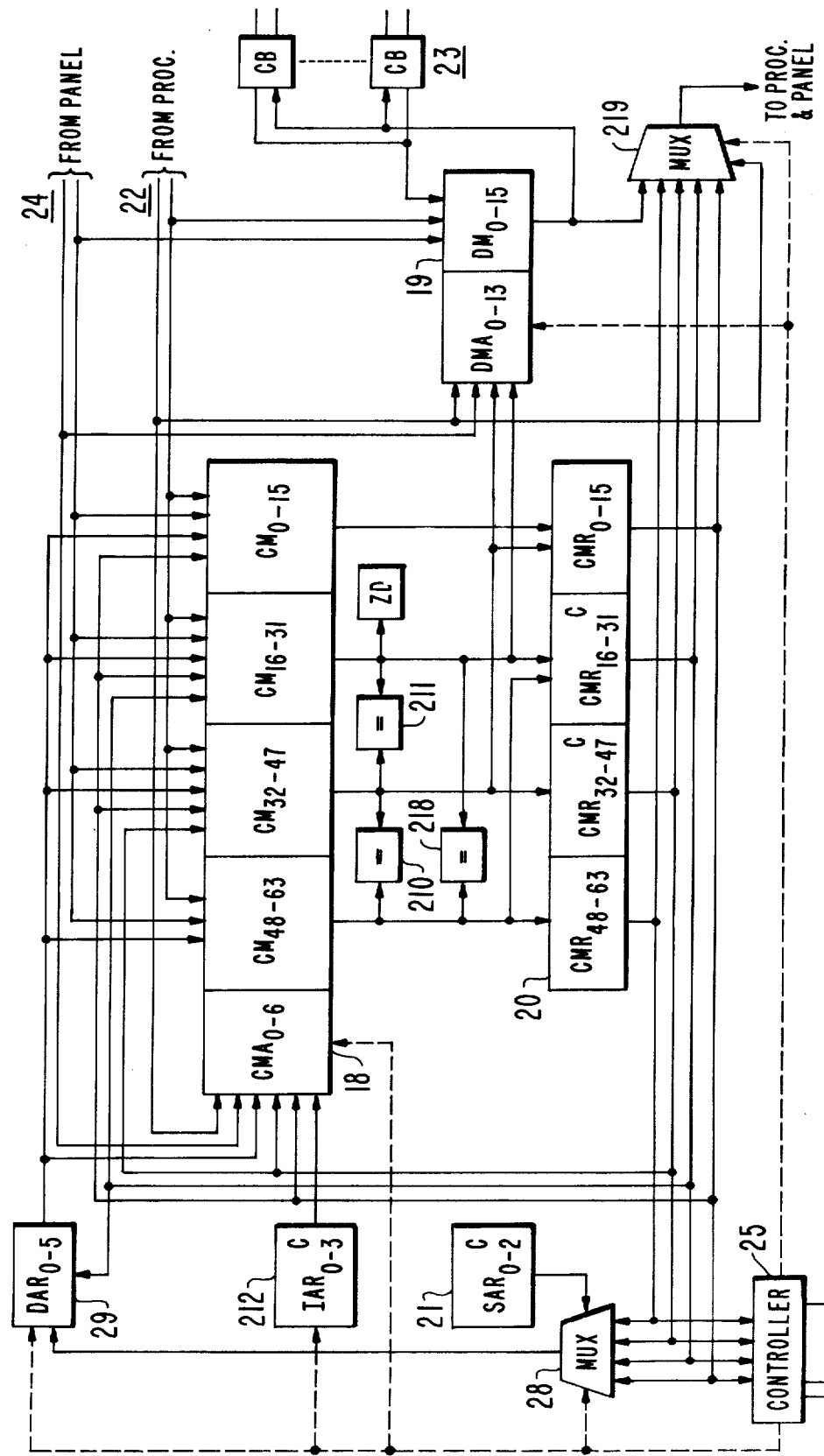
FIG. 2 is a block diagram showing the details of the buffer matrix according to the invention.

The BMX, as shown in FIG. 2, comprises three major units; the data memory 19 (data storage 19 in FIG. 1), the control memory 18, and the BMX controller 25 (included in the control logic 15 of FIG. 1). For purposes of illustration, the data memory 19 is organized in halfwords of 18 bits capable of either halfword (18-bit) or byte (eight-bits plus a parity bit) write operation and halfwood read operations. A full read or write cycle time is typically 600 nanoseconds with a read access time of 300 nanoseconds. The data memory 19 is used to store data in transit through the BMX. The memory functions as a collection of data buffers. The data memory 19 can be implemented by standard, commercially available devices and needs no further explanation because the operation of such memory systems is well known in the art.

The control memory 18 can be implemented as a solid state RAM (Random Access Memory) having a storage capacity of 128 words of 64 bits each. A control memory address thus requires only seven bits. The fully cycle and read access time is typically 55 nanoseconds. The control memory 18 contains control and addressing information used to access the data memory 19 and to direct characters to and from the trunks and subscribers. The word format depends on its purpose and is described below in more detail.

The control logic, which includes inter alia the controller 25, multiplexors 28 and 219, address registers 29, 212 and 21, and comparators 210, 211 and 218 in FIG. 2, is divided in four parts according to function-device service, memory service, trunk synchronization, and scan. The device service logic provides processing of all the trunks and subscribers one at a time. As each trunk or subscriber is accessed via the addressing logic, its set of operating parameters is read from the control memory 18 as a control word and staticized, i.e., stored, in a control memory register 20. A portion of the control word contains the data memory address of the character to be fetched or stored for the trunks' or subscribers' character buffer (CBSS) 23. The control word is updated and returned to the control memory 18. Each control word points to the next trunk or subscriber to be serviced. Trunks and subscribers are linked in this way to create a scan which permits each to receive data service at a rate equal to or greater than the nominal data rate for that device. Scanning is controlled by a device address register 29 (DAR) which stores the address of the character buffer (CBSS) 23 being serviced. If the addressed character buffer has assembled a character or transmitted all the bits of a previous character, it supplies a service request signal to the control logic. Such CBSS devices are commercially available, e.g., Model COM2601 (Standard Microsystems Co.).

After service of each full-duplex device (trunk or subscriber), the memory service logic interrogates the external memory request lines to determine whether there is an outstanding request. Either the processor over lines 22 or a maintenance panel over lines 24 may make such a request. Only one external memory service is provided at any given memory service interval, the processor having higher priority than the panel.

Although transmission of the trunk synchronization pattern is a software function, detection of the received trunk synchronization pattern is a hardware function. The trunk synchronization pattern comprises a unique sixteen-bit pattern repeated three times, occupying the first six character positions of every frame. Detection of a faulty synchronization pattern in any frame is counted as a "strike." Three consecutive "strikes" will cause data reception to be interrupted. This initiates a bit by bit search for the synchronization pattern. When a legitimate synchronization pattern is found, character reception is resumed on a trial basis, but a bit search will again commence when a faulty pattern is encountered. Once three consecutive frames with proper synchronization patterns are counted, the trial period is over and three "strikes" again will be required to interrupt data flow. A trunk control word, described in greater detail below, has assigned two frame counter bits that record the number of "strikes." A frame count bit is set when an error is detected in the synchronization pattern, a reframe bit is used to indicate whether the counter bits are counting correct or incorrect synchronization patterns.

Figure 3:
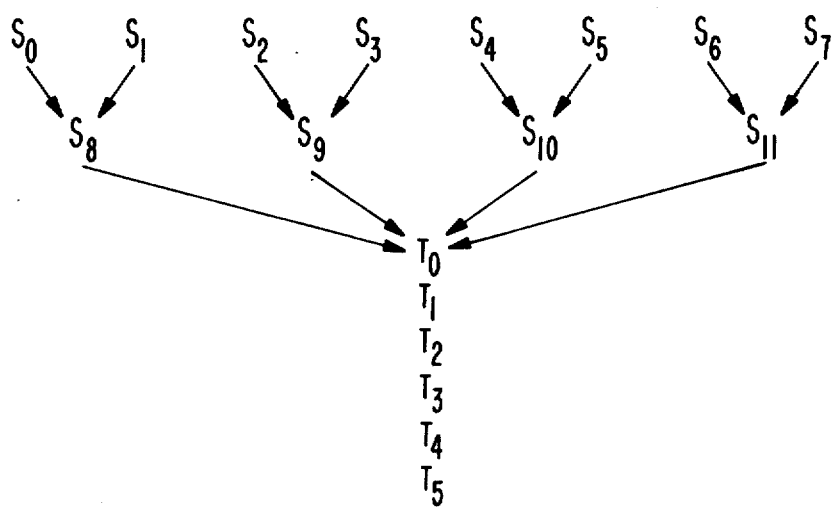
FIG. 3 is a directed line graph illustrating a subscan list.

A "next device" field contained in each device control word implements a repetititve service sequence. To accommodate devices of differing speeds, it is possible to scan some subscribers (or trunks) at ½, ¼, or ⅛ the speed of others. This is accomplished by forming and sequencing subscans. A control memory location is dedicated to this function and contains up to eight devices' addresses, each of which defines a subscan starting address. The following example will illustrate the implementation of this function. Assume devices S0 thru S7 each have a data rate of r/8, devices S8 thru S11 have a data rate of r/4, and devices T0 thru T5 have a data rate of r. The scan table can be diagrammed as shown in FIG. 3, which is interpreted as follows. The address and device are both designated by $S_i$. The scan locations S0 and S1 both designate S8 as the next scan location. The scan locations S2 and S3 designate S9, and so on. The scan locations S8-S11 designate T0 and the $T_i$'s follow in sequence. The device T5 is uniquely identified as the "end of scan" device and has in its "next device" field, variable control memory locations designated as the "start of subscan" locations. The contents of that location are S0, S2, S4, S6, S1, S3, S5, S7, respectively. When T5 service is completed, the scan enters at S0 on the first iteration, S2 on the second, S4 on the third, and so on until the final entry point S7 is used; then S0 is used again, and so on. The entire scan sequence is as follows:

S0, S8, T0, T2, T3, T4, T5
S2, S9, T0, T1, T2, T3, T4, T5
S4, S10, T0, . . , . . . , . . . , . . . , T5
S6, S11, T0, . . , . . . , . . . , . . . , T5
S1, S8, T0, . . , . . . , . . . , T5
S3, S9, T0, . . , : . . . , . . . , T5
S5 S10, T0, . . , . . . , . . . , . . . , T5
S7, S11, T0, . . , . . . , . . . , . . . , T5
S0, S8, T0, . . , . . . , . . . , . . . , etc.

It can be seen that T0 appears eight times more often than S4, for example, and four times more often than S9, for example.

Figure 4:
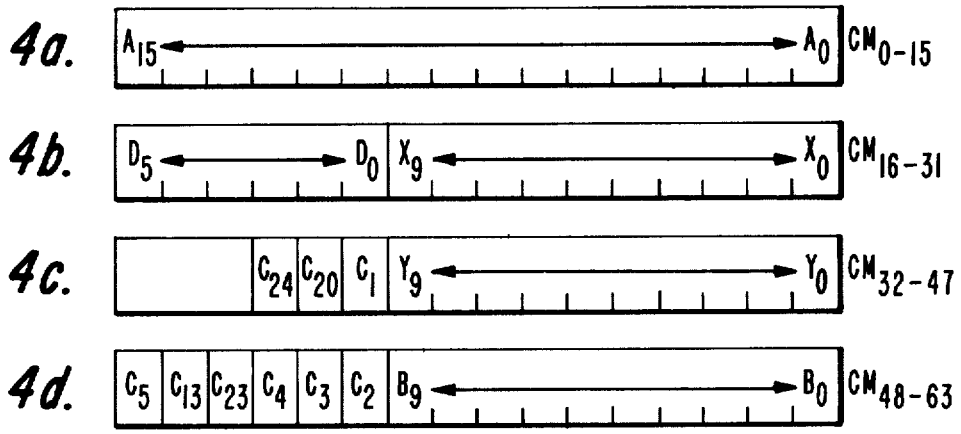
FIG. 4 is an exemplification of a subscriber control word as stored in the control memory of the buffer matrix.

The format of subscriber control words (SCW) is shown in FIG. 4. Each SCW comprises four halfwords (HW) of sixteen bits each. Each subscriber (not trunk) serviced by the BMX is assigned an input SCW and an output SCW in the control memory. Each SCW defines an area in the data memory 19 (FIG. 2) which functions as a buffer.

The first halfword of the SCW is shown in FIG. 4(a) and comprises a sixteen-bit A-address denoting the starting address (left-most boundary) in the data memory of the buffer area assigned to the associated subscriber. The second halfword shown in FIG. 4(b), contains a 10-bit X-address denoting the current input address. There is also a six-bit D value denoting the next device to be scanned. The third halfword, shown in FIG. 4(c), contains a 10-bit Y-address denoting the current output address of the buffer in the data memory. A bit, C1, denotes an X address overflow. Another bit, C20, is the last subscan indicator bit. A third bit, C24, is used as an interrupt interlock bit. The fourth halfword of the SCW, shown in FIG. 4(d), contains a 10-bit B-address denoting the final address of the subscriber's buffer in the data memory; it also contains six control bits. The C2 bit, when set, indicates that an interrupt is to be initiated when X=B; C3, when Y=B. The C4 bit is an interrupt interlock clear. The C23 bit is an end-of-scan indicator. The C13 bit is a trunk (TCW) indicator bit, i.e., when C13=1, the control word is a trunk control word (TCW). When bit C5=1, it indicates the channel is out of service.

Each trunk serviced by the BMX is assigned an input trunk control word (TCW) and an output TCW stored in the control memory. Each TCW is a set of working parameters identifying the subscriber whose buffer is currently coupled to to the trunk. Each TCW contains a subscriber identification number, a current byte count denoting the number of bytes remaining too be processed for that subscriber, and a trunk list pointer denoting a control memory address where the next trunk list entry (TLE) may be found.

Figure 5:
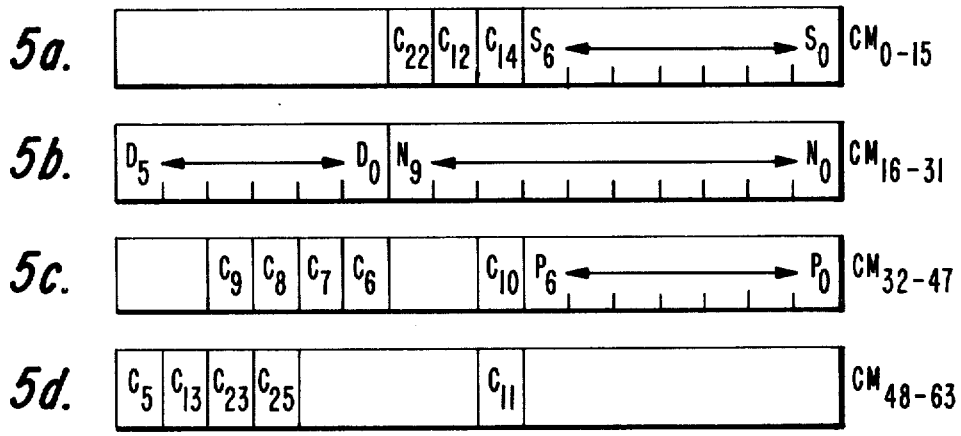
FIG. 5 is an exemplification of a trunk control word as stored in the control memory.

The first halfword of a TCW, shown in FIG. 5(a), contains a seven-bit control memory address associated with the current device (e.g., CBSS) being serviced, as well as three control bits. The C14 bit is an end-of-list indicator, the C12 bit is a CCIS (see below) identifier bit, and the C22 bit is a rollback list bit. The second halfword, shown in FIG. 5(b) contains a 10-bit byte counter (N0-N9) and a six-bit D-character. The N-counter keeps track of the number of bytes in the current frame. The D-character has the same function as in an SCW. The third halfword, shown in FIG. 5(c) contains a seven-bit pointer (P0-P6), indicating the address in the control memory of the trunk lists, and five control bits. The C10 bit is used as a trunk list indicator; when C10 = 0, the A-list is in use and when C10 = 1, the B-list is in use. The A- and B-lists are explained below. The C6-C9 bits comprise the frame count control; C6 and C7 are the frame counter; C8 is the frame count bit; and C9 is the reframe bit. The fourth halfword of the TCW, shown in FIG. 5(d) contains five control bits. The C11 bit is the pending frame list indicator (0 = A-list; 1 = B-list). The C25 bit is a BMX out of service indicator. The C23, C13, and C5 bits perform the same functions as described for the SCW.

Each trunk has an associated list of trunk list entries (TLE) stored in the control memory identifying which subscribers and the number of bytes from each are to be contained in a trunk "frame." The list is accessed by the trunk list pointer (P0-P6) in the TCW. Both the transmit trunk service and the receive trunk service use the same trunk list. As the processor schedules a new voice call connection or discontinues an old one, it constructs a new trunk list. This new list must be substituted for the old one precisely as a new frame is begun. Thus, two lists (A- and B-lists) are provided for each trunk, one in current use and one being constructed by the processor. These lists are stored together in the control memory.

Figure 6:
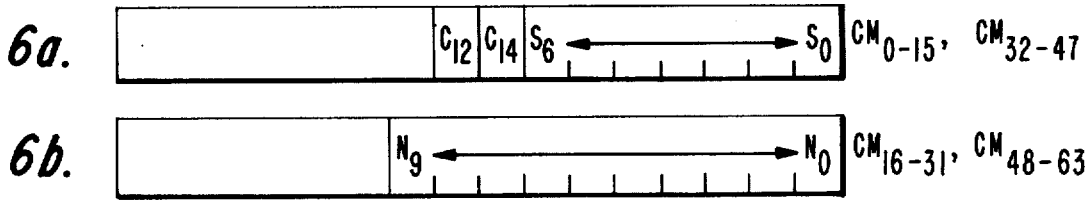
FIG. 6 is an exemplification of a trunk list entry word as stored in the control memory.

Each trunk list entry (TLE) requires only two halfwords so each control memory word contains two TLEs. The TLE in the most significant two halfwords are the A-list and the TLE in the least significant two halfwords are the B-list. The first halfword of a TLE, shown in FIG. 6(a) becomes the first halfword of a TCW without the C22 bit. The second TLE halfword, shown in FIG. 6(b) becomes a portion of the second halfword of a TCW and in addition contains a 10-bit counter indicating the number of bytes in the current frame assigned to the associated subscriber.

A character buffer scan addresses each subscriber in turn. If a subscriber's buffer is addressed, it may respond with a service request as described above. As a result, the SCW for that subscriber is fetched from the control memory. If the character buffer being serviced is an input buffer, the X-address of the SCW is incremented by one and is used as the data memory address, the data character being stored at that location. In the case of an output buffer, the Y-address is incremented and used to fetch a character from the data memory to be placed in the associated character buffer. When the SCW is fetched, certain comparisons are made, e.g., Y>X (indicated by the appropriate output signal from a comparator 211 (FIG. 2)) indicates an overflow or underflow. If X = B, (indicated by the appropriate output signal from a comparator 218 (FIG. 2)), X is replaced by A. If Y = B, (as indicated by the appropriate output signal from a comparator 210 (FIG. 2)), Y is replaced by A. When X = B, a "wrap around" condition is indicated, X is replaced by A and a carry bit is set in A to maintain X≦Y. Subsequently, when Y = B, and A replaces Y, the carrry bit is reset.

When the device scanner addresses a trunk character buffer and determines that service is required, the TCW for that trunk is accessed in the control memory. The TCW contains the subscriber number of the device whose data is to form a part of the current frame for the trunk. The subscriber number is used to access the SCW for that subscriber. A list of subscribers is assigned to each trunk and byte counts defining the makeup of the current frame. The TLP (trunk list pointer) in the TCW is used to access a new TLE (trunk list entry). As each entry's byte count is exhausted, a new TLE is acquired and the TLP is incremented. This continues until the end of list bit (C14) is set.

The block diagram of FIG. 2 shows the interconnections among the components of the BMX; some of the components have already been described. Subscriber and trunk lines terminate at the BMX in character buffers (CBSS) 23, which are selectively coupled to the data memory 19 by control signals 26 from a controller 25. The gating networks for coupling individual character buffers 23 to the data memory 19, as well as those networks for coupling address and data to certain buses, are omitted for clarity. Such networks are well known in the art. The multiplexing of the addresses into addressing terminals is also well known and is accomplished by certain ones of the control lines 26. Scanning and consequently subscanning, is accomplished via certain of the control lines 26 and a scan address register (SAR) 21, which receives the start of scan address as described above in connection with subscanning.

The SAR contents operate a multiplexer 28 to couple the address of the device to be scanned to the device address register 29, which also can receive a device address from a TCW, TLE, or interrupt list entry (ILE).

Figure 7:
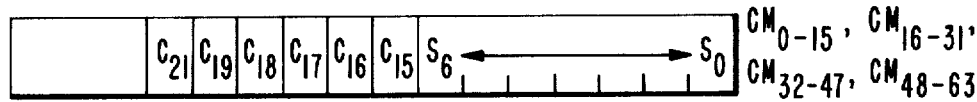
FIG. 7 is an exemplification of an interrupt list entry word as stored in the control memory.

The format of an ILE is shown in FIG. 7. Four ILE's are stored in one control memory word. The S0-S6 bits designate the current device number. The C15 bit is a frame synchronization error indicator. Bits C16 and C17 indicate X = B interrupt and Y = B interrupt, respectively. The C18 bit is an X > B or Y > B indicator. The C19 bit indicates an overflow or underflow interrupt, and the C21 bit indicates a data memory parity error. The ILE is used in the interrupt address register 212.

To enable the processor associated with the BMX to interrogate the memories 18 and 19, the lines 22 can address either memory and return the contents of the addressed location to the processor via a multiplexor 219.

Figure 8:
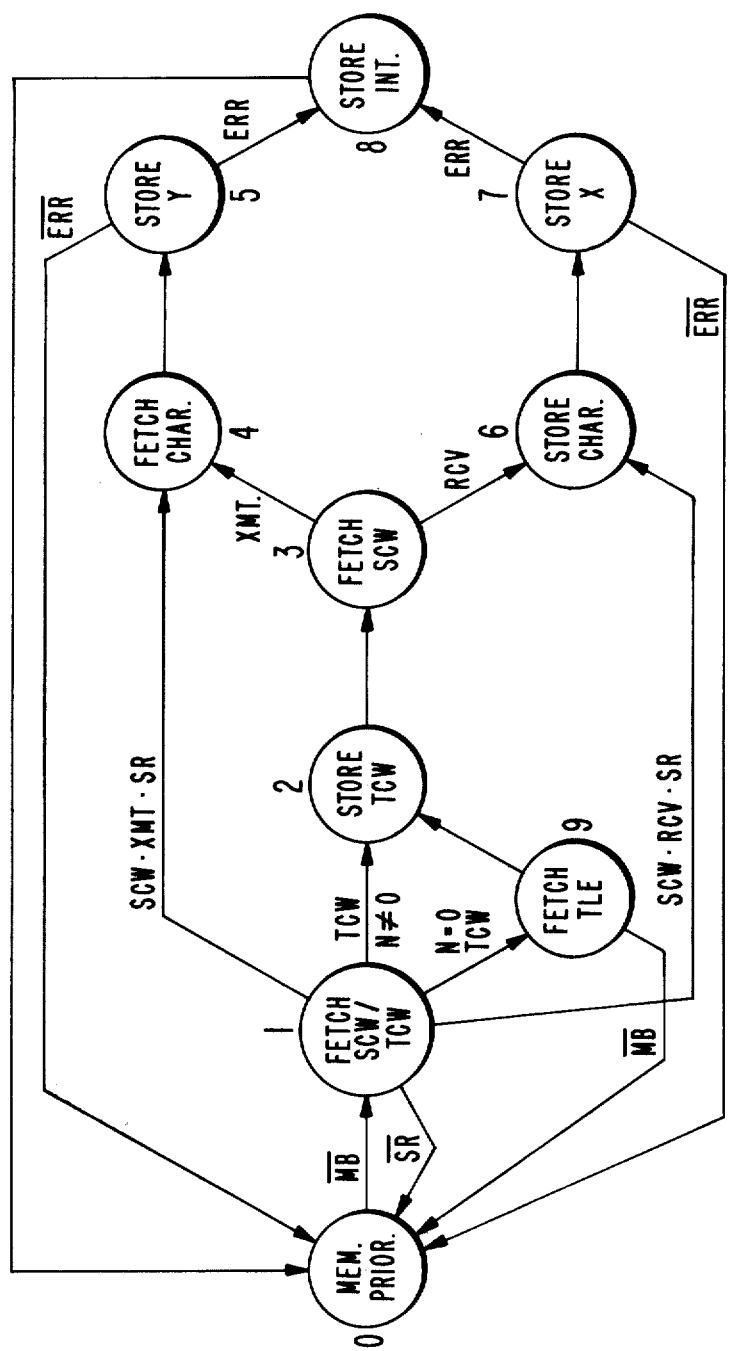
FIG. 8 is a machine state flow diagram of the BMX controller.

The detailed operation of the controller 25 is shown by the state flow diagram of FIG. 8 and the flow chart related thereto shown in FIG. 9. As shown in FIG. 8, machine state 0 is used to handle external memory requests. The entries into various states are tabulated as follows:

State 0 = (State 5 + State 7) · $\overline{ERR}$ + State 8 + State 9 · $\overline{MB}$ + State 1 · ($\overline{CBSR}$ + COS)
State 1 = State 0 · $\overline{PROC\ REQ}$ · $\overline{MB}$
State 2 = State 9 + State 1 · TRUNK · $\overline{COS}$ · CBSR · N≠0
State 3 = State 2
State 4 = State 3 · XMT · TRUNK + State 1 · CBSR · XMT · TRUNK
State 5 = State 4
State 6 = State 3 · RCV · TRUNK + State 1 · CBSR · RCV · TRUNK
State 7 = State 6
State 8 = (State 5 + State 7) · ERR
State 9 = State 1 · TRUNK · COS · CBSR · N=0

The operation and signal abbreviations used in the above list and in FIG. 9 are:

+ = logical OR (in flow chart + = add);
· = logical AND (takes precedence over +);
− = logical NOT (takes precedence over + and ·);
→ = transferred from → to;
( ) = "contents of" register or location specified by identifier within the parenthesis, e.g., (A) → Y means the contents specified by A are transferred into Y.
x:y = comparison of x and y;
CB = character buffer;
CBSR = character buffer service request;
CM = location of control memory presently addressed;
CMA = control memory address register;
COS = channel out-of-service;
CT = count;
DM = location in data memory presently addressed;
DMA = data memory address;
INDIC = indicator of receive or transmit service;
MB = memory break request;
N = (N0–N9 of TCW) subscriber byte count;
P = (P0–P6 of TCW) address of next TLE;
PROC REQ = processor request;
RCV = machine servicing a receive character buffer;
S = subscriber's number (S0–S6);
SS = start-of-subscan device;
SSA = start-of-subscan memory location;
SYN1 = first byte of synchronization pattern;
SYN2 = second byte of synchronization pattern;
TRUNK = trunk being serviced, i.e., using TCW; and
XMT = machine servicing a transmit character buffer.

The abbreviations already identified, e.g., X, Y, A, are not listed above.

Figure 9A:
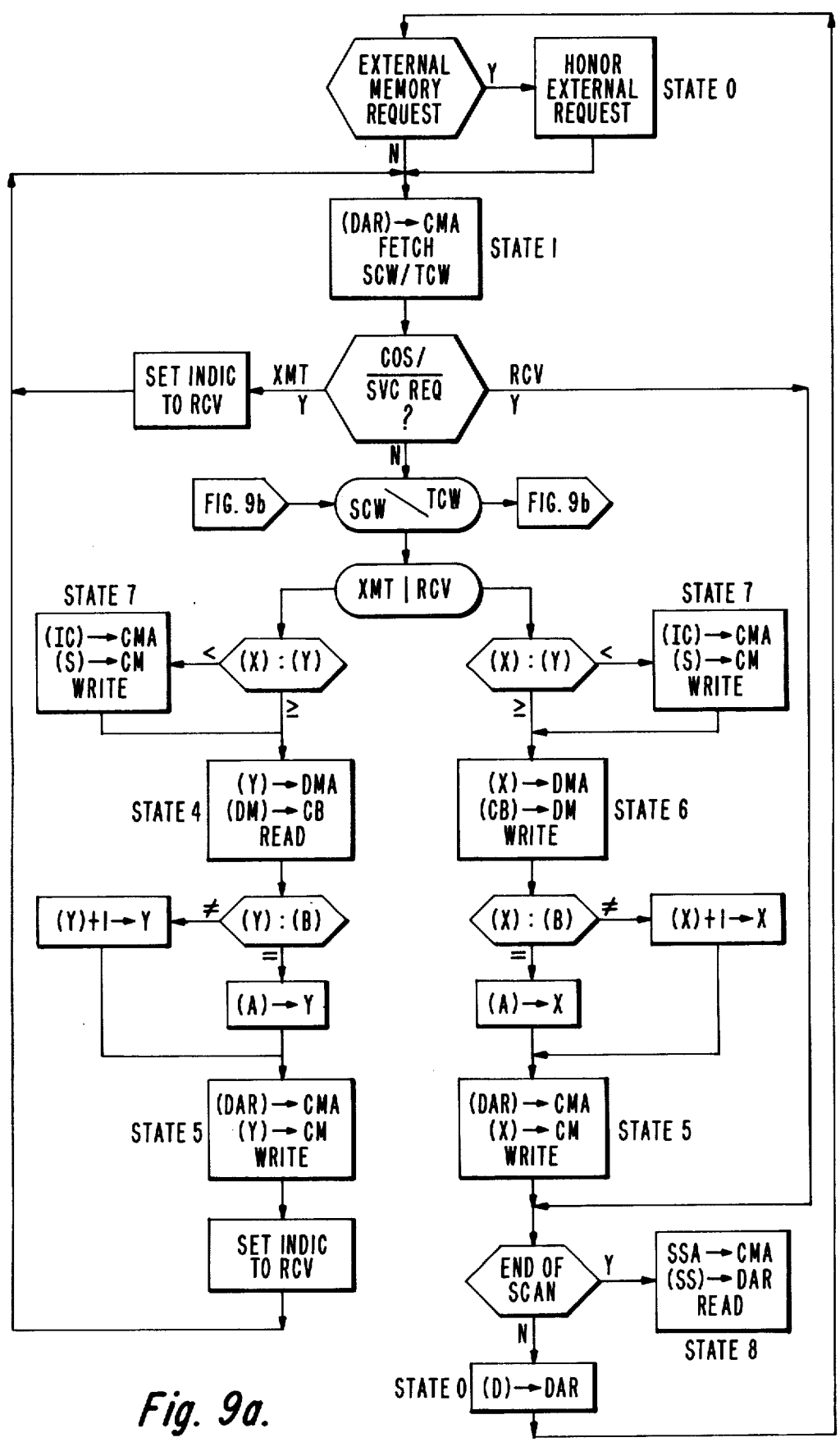
FIG. 9 is a flowchart showing in detail the operation of the BMX controller.
Figure 9B:
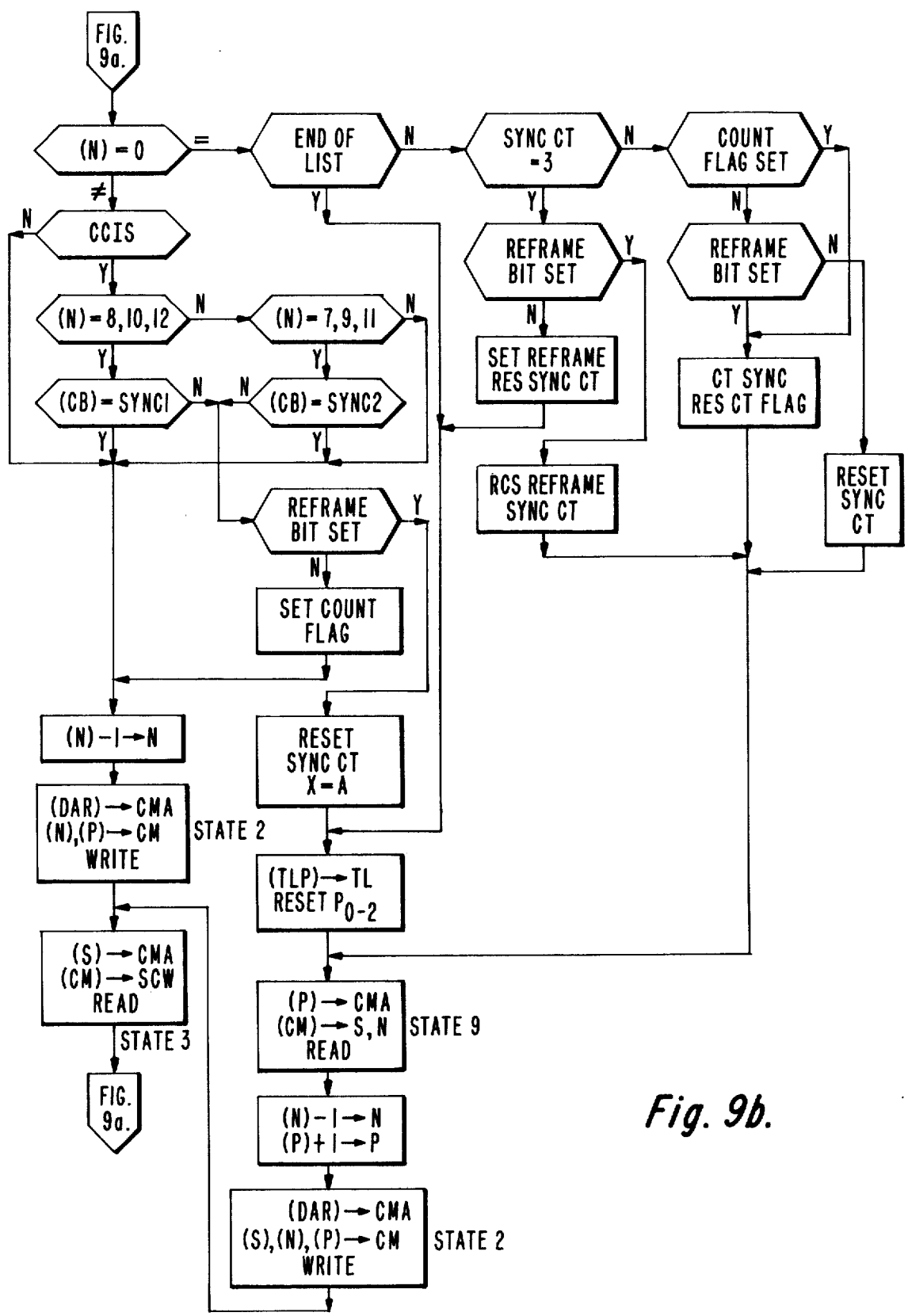

The flowchart of FIGS. 9a and 9b is self-explanatory and uses the symbols conforming to USASI (U.S.A. Standards Institute).

The system described is capable of data switching and dynamic channel allocation as described above. That is, frames comprising both message data and digitized voice in varying amounts can be assembled and sent over high speed lines to increase the efficiency of the communication system of which the BMX is a part. The frame make-up, i.e., data versus voice apportionment, can be changed through the CCIS portion of the messages transmitted between trunks.

In addition to the frame synchronization, there is a method of describing a change in the makeup of the slots within a frame. To allow each end of the communications link to know the makeup of a frame, a method has been established to coordinate this frame change situation. An additional six bytes of information are transmitted with each frame immediately following the frame synchronization pattern. These six bytes inform the receiving node of impending changes in frame makeup and are called the CCIS. The control information is defined as no change, change next frame, change this frame.

The method of informing the receiving node of a new call arrival or a call take-down is by transmission of a control packet. Upon the arrival of a new call at a node, a control packet is constructed which consists of all the necessary information to set up the call. This includes the called number, precedence, and any routing information required. In addition, the control packet will contain the organization of the frame once this new call is established. This control packet is placed at the top of the cue of the highest priority data cue and is transmitted in turn to the receiving node. The receiving node processes the information received; then it transmits on the return link a packet of information to describe the makeup of the return frame. Once acknowledgements have taken place, the call is set up by sending a "change next frame" control byte following the synchronization pattern in a given frame, and in the succeeding frame, "change this frame" is transmitted. When the receiving node and the transmitting node have agreed that a new call is to be established (or a call to be taken down), a set of tables are established at each end which define what the frame will look like when the change occurs. Upon receipt of "change this frame," the received information is parititioned as described in the new set of frame tables. No. excess overhead is expended for describing the makeup of a frame, but rather, only frame information which describes a change in a frame makeup is transmitted.

Figure 10:
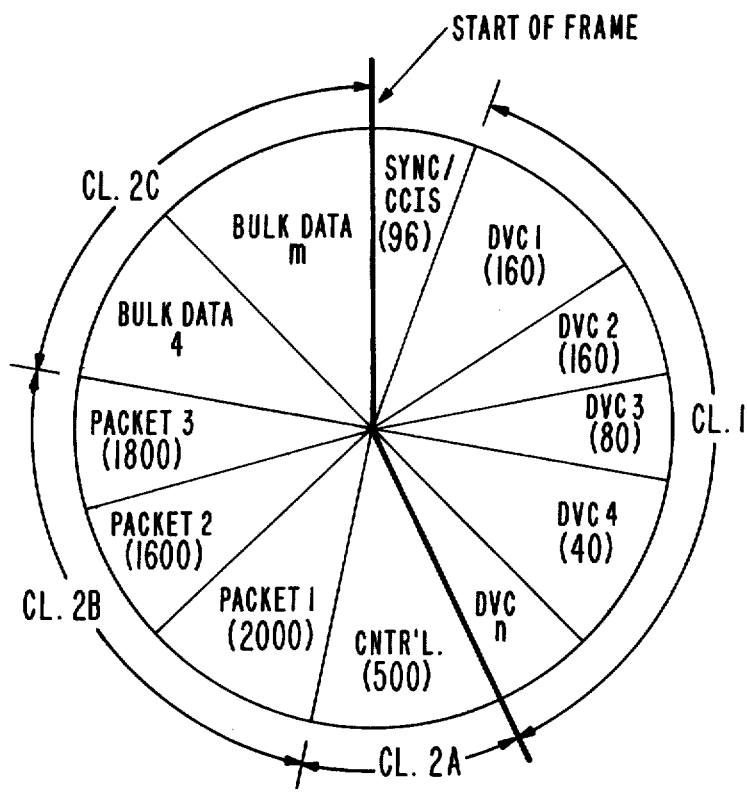
FIG. 10 is a timing chart illustrating dynamic channel allocation.

FIG. 10 depicts an example of a frame in a dynamic channel allocation scheme. The example depicts the frame as starting at the 12 o'clock position and progressing clockwise. In this example, a data rate of 1.536 megabits per second and a frame size of 10 milliseconds is assumed, resulting in a frame length of 15,360 bits.

Upon start of a new frame transmission, the first 48 bits form the synchronization pattern, followed by 48 bits of frame control information (CCIS). Following these 96 bits, portions of digital voice calls (DVC) in progress are transmitted. In the example, DVC1 represents Digital Voice Call 1 in progress. A total of 160 bits are required to maintain the flow of information for this digital voice call. For a frame of 10 milliseconds as in this example, this represents a 16KBPS (kilobytes per second) digital voice call in progress. A DVC3 of 80 bits represents an 8KBPS digital voice call in progress, and a DVC4 represents a 4KBPS call. Portions of voice calls in progress continue to be transmitted until a marker is reached which defines the end of the voice portions of this frame and marks the beginning of data.

There is no actual marker defining the border between voice and data, but rather a marker in the frame tables established at each end of the link. The marker really defines all of the voice portions of the frame so bit integrity control is unnecessary. After the marker, if there is a control data packet to be transmitted, it is then transmitted in its entirety. All data packets in this example are treated as data packets with ADCCP protocol performed to insure bit integrity. For example, the first packet shown is a control packet of 500 bits and it contains information for changing the makeup of a frame due to the addition or subtraction of voice calls currently in progress. Following the control packet, data packets are transmitted from a data queue as long as there are data packets to be transmitted. At the conclusion of the data, bulk information is transmitted. In this example, bulk information is treated only as a lower priority form of data.

In general, the boundary of a packet will not correspond with the boundary of a frame. Assuming that the last packet transmitted, data packet M in the example, contains 2,000 bits and that there is only space in this frame for 1200 bits, then upon reaching the marker dividing voice and data in the second frame transmitted, the remainder of packet M from the preceding frame will be transmitted.

In summary, in this method of implementation, a communications controller controls the flow of information through a memory operating as a shared memory to the local processor. Around this memory are a control logic and a control memory which allows the data portions of digital voice calls to be handled independently of the processor once a call is set up. The control memory included with the buffer matrix contains information for each subscriber and trunk to be serviced by the buffer matrix. The control memory is set up during initialization by the communications processor and contains information which controls the scan of channels and the characteristics of each channel. The communications processor establishes a frame list in the buffer matrix data memory and this frame list is used by the controller to handle channels which are active and in which subslots within a frame to place specific information. Space is allocated in the buffer matrix memory for two frame lists. One list is the current one in use to describe the makeup of a frame and the second list is set up by the communications processor when it is necessary to change the makeup of a frame. The signalling and supervision function of digital calls are controlled by the communications processor and only when the call is established does the buffer matrix take over to handle the data portions of a voice call. In the frame lists, pointers describe when the voice portions have been transmitted and when to switch to data for transmission in ADCCP format. The packet data is received by the Buffer Matrix from a communications processor system which is controlling the message protection and routing functions of the packet network.

This method of implementation allows all the variables of the communications channel link to be controlled by the communications processor, while removing from the processor the basic load of handling the data portions of digital voice calls. This off-loading of the communications processor of the work associated with handling the digital voice calls once set up results in an improvement in the throughput of such a system.

What is claimed is:

1. A communications control system including a plurality of buffer means for receiving and transmitting data, data memory means including addressing means, and data port means for storing data, comprising in combination:

buffer selector means for coupling a selected one of said buffer means to the data port means of said data memory means;

control memory means including addressing means and data port means for storing control words in addressed locations;

control word register means having at least one section coupled to the data port means of said control memory means for storing active control words;

means responsive to one section of the control word register means for coupling an address portion of an active control word to the addressing means of said data memory means;

means responsive to a section of said control word register for selectively coupling another address portion of an active control word to the addressing means of said control memory means; and, means responsive to a section of said control word register for coupling a portion of an active control word to said buffer selector means.

2. The invention as claimed in claim 1 wherein said buffer selector means includes:

device addressing means for storing signals representative of a selected one of said buffer means;

means coupling said device addressing means to the addressing means of said control memory means for retrieving control words related to said selected one of said buffer means; and, means responsive to said control word register for coupling a next device indicator portion of the active control word to said device addressing means for selecting a next buffer means.

3. The invention as claimed in claim 2 further comprising scan addressing means for storing signals designating a section of said control word register means and multiplexor means coupled to said control word register means and responsive to said scan addressing means for coupling the designated section of said control word register means to said device addressing means.

4. A communications control system having dynamic channel allocation capabilities comprising, in combination:

a plurality of buffer means for receiving and transmitting data;

data means for storing data at addressable locations;

control memory means for storing subscriber control words and trunk control words, said trunk control words representative of frames of data to be transmitted, including address portions indicative of subscriber control words;

control word register means for storing addressed control words retrieved from said control memory means;

control means responsive to said control word register means for producing a plurality of control signals, means responsive to certain ones of said control signals for coupling a portion of said control word register means to said data memory means;

means responsive to certain other control signals coupling a selected buffer to said data memory means for storing at an addressed location data to be transmitted within a frame; and means coupled to said control memory means for changing boundary locations of a frame.

5. The invention as claimed in claim 4, further comprising means coupled to said control memory means for inserting in a frame data representative of changes in frame boundaries.

* * * * *